Patented July 27, 1937

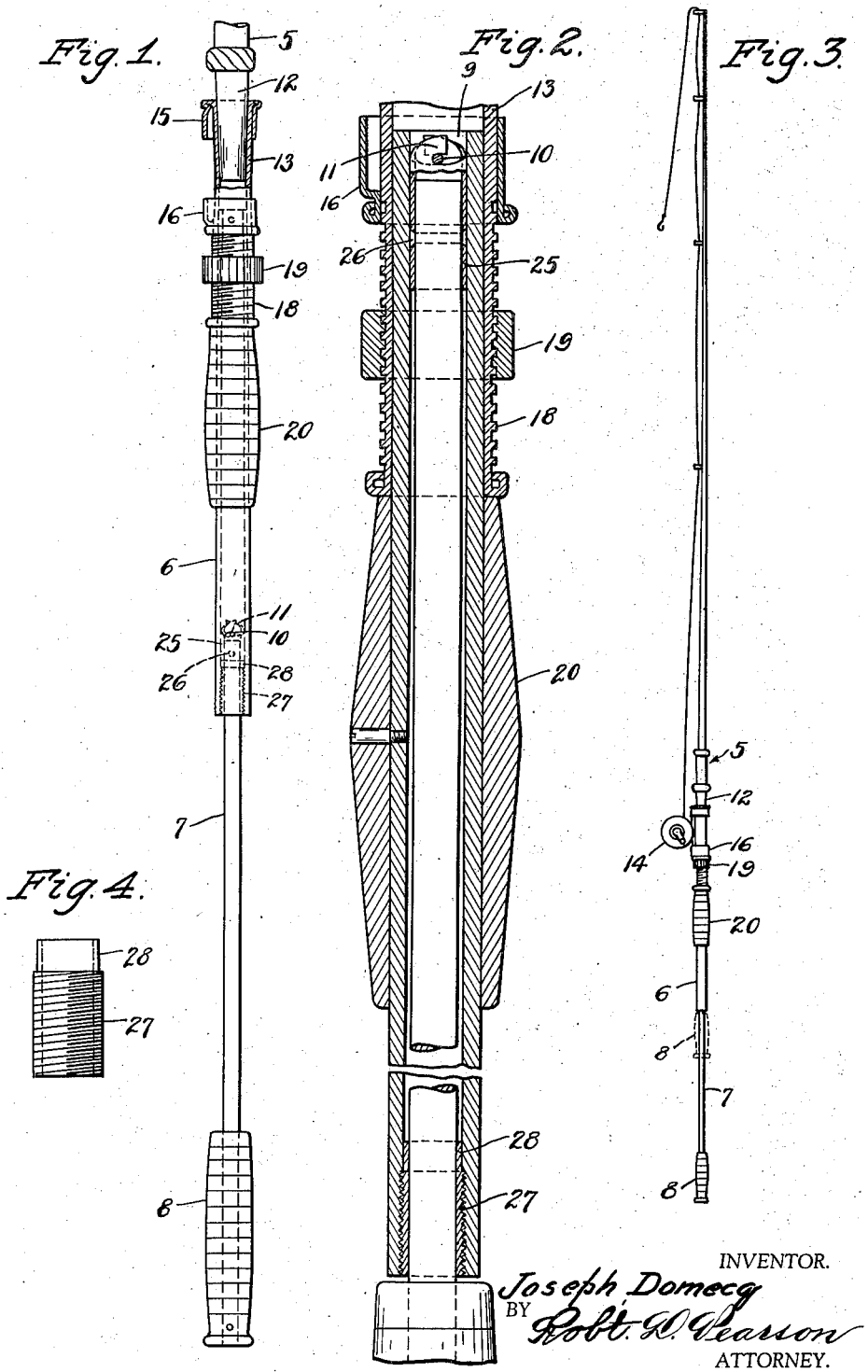

2,088,132

UNITED STATES PATENT OFFICE 2,088,132

FISHING ROD

Joseph Domecq, Los Angeles, Calif.

Application February 24, 1936, Serial No. 65,269

2 Claims. (Cl. 43—23)

This invention relates to an attachment applicable to fishing rods now on the market to render such rods capable of being manipulated in a more efficient manner, and to render a fishing rod assembly capable of being lengthened to make same more flexible in its manipulation.

More specifically stated, the invention pertains to the combination, with a novel, compact and flexible fishing rod, having jointed and extensible members which may be carried in sections and readily assembled for use.

Other objects, advantages and features of the invention will hereinafter appear.

Referring to the accompanying drawing, which illustrates what is at present deemed to be a preferred embodiment of the invention, Fig. 1 is a side elevation of the device showing only a fragment of the fishing rod to which it is attached, in an extended position.

Fig. 2 is a longitudinal mid-section showing the working parts of the device on a larger scale than in Fig. 1, in a contracted position, parts being broken away to shorten the view.

Fig. 3 is a side elevation of a complete fishing rod equipped with the device as an attachment therefor.

Fig. 4 is a side elevation of the bushing having a reduced end portion shown in Fig. 2.

Referring in detail to the drawing, regarded as an attachment to a conventional fishing rod 5, the main parts of the device are the elongated tubular or socketed body portion 6, with which cooperates a rod 7 one end portion of which has mounted thereon a handle sleeve or hand grip 8, the remaining portion of said rod fitting slidably within said socketed portion 6. The socket 9 of part 6 is shown having near its inner end a stationary catch pin 10, the inner end of the rod 7 carrying catches 11 to cooperate with said pin for the purpose of releasably latching the rod in the contracted or inserted condition, the latching means thus provided being operable by turning the rod 7 in reverse directions to engage and disengage the cooperating parts of the latching means.

The fishing rod 5 has a slightly tapered base or end portion 12 and the attachment is shown having at its inner end a thimble or socketed part 13 the socket of which is slightly tapered so as to receive the part 12 in a firmly friction tight manner. The part 13 is shown provided with the collars 15 and 16 for holding the line reel 14 (see Fig. 3) and with an externally screw threaded portion 18 along which screws the nut 19 that actuates the adjacent reel-holding collar 16.

The adjacent part of the tubular body 6 has a hand grip sleeve 20 mounted thereon.

It will be seen that the attachment includes the inner tube 6, to which the hand grip 20 is secured, and around which is fitted and to which is secured the outer tube 13 having at one extremity a slightly flared portion into which the tapered butt 12 of the fishing pole is wedged. This affords a simplified, strong construction.

When the attachment is used on ordinary fishing rods the rod 7 may be made solid, but a tubular rod in the same situation would come within the scope of the claimed invention.

A stop means is provided to limit the extent to which the rod 7 can be extended from the tubular body 6. Said stop means includes a sleeve 25, whereon the catch lugs 11 already referred to are formed, said sleeve being secured to the rod 7 by means of a pin 26. Into the outer end portion of the tubular part 6 is screwed a bushing 27 having a diametrically reduced inner end portion 28 which fits snugly within the part 6. The outer end of the sleeve 25 abuts against said portion 28 when the device is in the fully extended condition shown in Fig. 1. It will be observed that the same sleeve (25) which carries the catches 11 also forms one of the stop members, thus adding to simplicity and compactness of construction.

Owing to the fact that the bushing 27 screws into the outer end portion of the tubular body of the device, said bushing is securely anchored against being displaced by the impact of the stop collar 25 thereagainst when the device is forcibly extended.

In using the device the fisherman will ordinarily keep the attachment in its contracted condition. Whenever, however, he succeeds in engaging his hook with a fish of considerable size, he will slightly rotate the lower hand grip 8 and rod 7 thus unlocking the lugs 11 from the pin 10, whereupon he will extend the attachment to the position shown in Fig. 1, in which position the combined fishing pole proper and attachment will possess an added resiliency and leverage enabling him to manipulate the whole pole in a more effective manner.

I claim:

1. An elongated extensible device attachable axially to the butt portion of a fishing rod and including a tubular member and an auxiliary rod slidably and extensibly mounted therein, there being stationary catch means within said tubular member, a sleeve secured around the inner end portion of said auxiliary rod, said sleeve having formed thereon catches operable by turning said auxiliary rod to engage and disengage said stationary catch means, and a bushing screwed into the outer end portion of said tubular member, said bushing cooperating with said sleeve as stop means to limit the extensibility of said auxiliary rod.

2. An elongated extensible device attachable axially to the butt portion of a fishing rod and including a tubular member and an auxiliary rod slidably and extensibly mounted therein, and a bushing screwed into the outer end portion of said tubular member, said extensible rod carrying stop means engageable with said bushing when the rod is fully extended.

JOSEPH DOMECQ.